(No Model.)
F. A. PELTON.
PIPE HANGER.
No. 518,825. Patented Apr. 24, 1894.
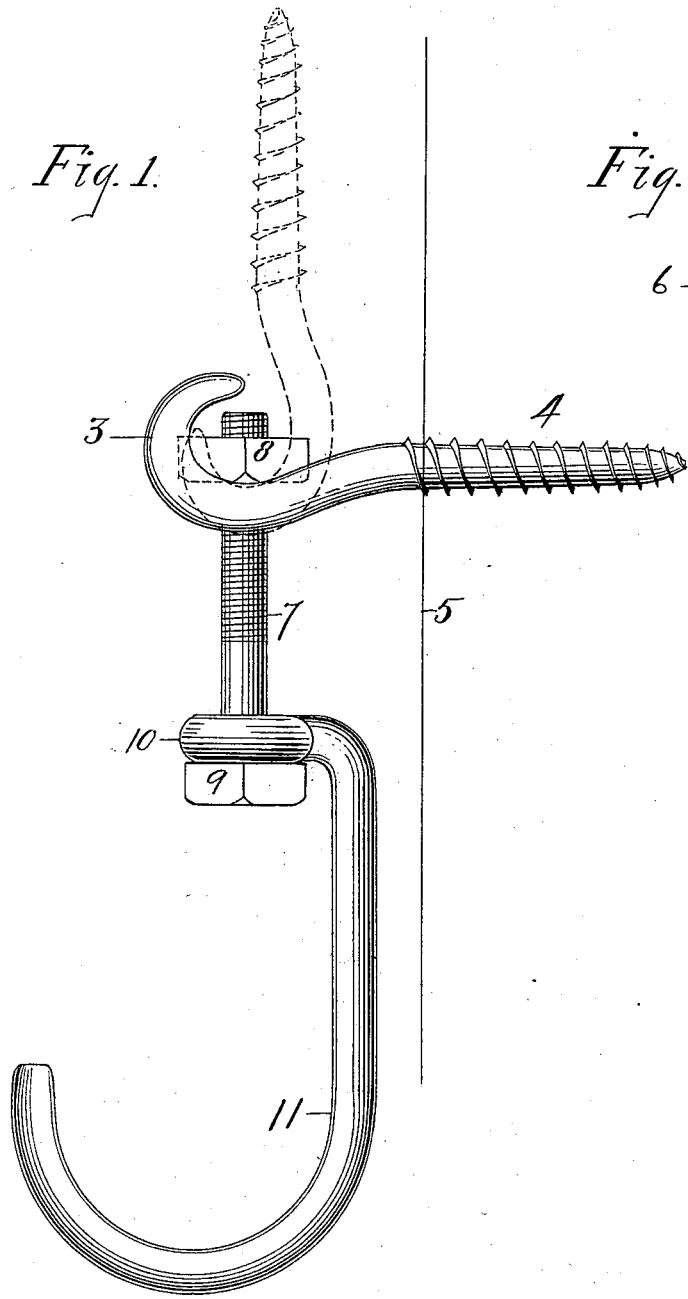
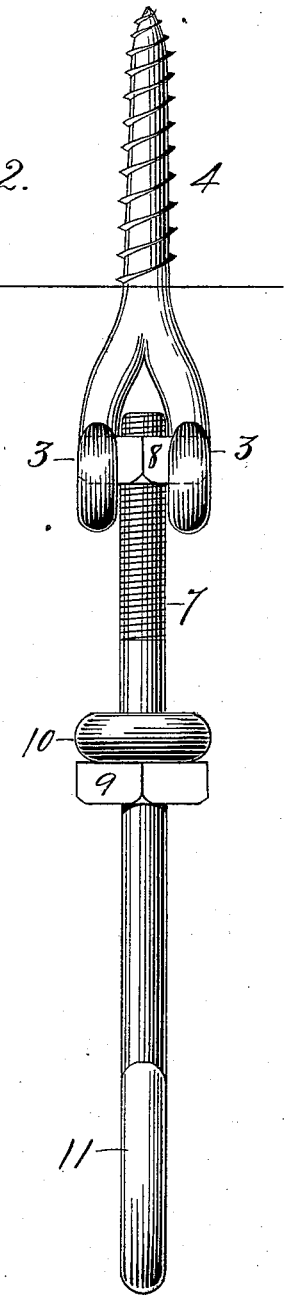
Witnesses
G. N. Stipek.
C. Garvin Loomis Jr.
Inventor
Francis A. Pelton.
By James Shepard.
Atty.

United States Patent Office.

FRANCIS A. PELTON, OF NEW BRITAIN, CONNECTICUT, ASSIGNOR OF ONE-HALF TO CHARLES J. WHITE, OF SAME PLACE.

PIPE-HANGER.

SPECIFICATION forming part of Letters Patent No. 518,825, dated April 24, 1894.

Application filed April 28, 1893. Serial No. 472,201. (No model.)

*To all whom it may concern:*

Be it known that I, FRANCIS A. PELTON, a citizen of the United States, residing at New Britain, in the county of Hartford and State of Connecticut, have invented certain new and useful Improvements in Pipe-Hangers, of which the following is a specification.

My invention relates to improvements in pipe hangers, and the objects of my improvement are simplicity and economy in construction and general efficiency and convenience in use.

In the accompanying drawings: Figure 1 is a side elevation of my pipe hanger. Fig. 2 is a front or edge view of the same with the supporting hooks in a different position.

I form the two parallel hooks 3 3 upon a suitable shank 4 which is screw threaded for being attached to any suitable support as shown. In Fig. 1, I have represented the same as secured to a vertical wall or support, the surface of which is indicated by the line 5, while in Fig. 2, and in the broken lines in Fig. 1, I have represented the same as secured to an overhead support, the under surface of which is represented by the line 6 in Fig. 2. These hooks 3 are separated from each other a sufficient distance to receive the threaded body 7 of a bolt between, while the nut 8 of said bolt may rest upon the hooks whether its supporting shank is in a horizontal or vertical position and the head 9 of the bolt forms a suitable support for the eye 10 or upper part of the hanger 11. This hanger is in the form of a simple hook, but the particular form of the hanger that is supported from the bolt is not essential to my invention and any other ordinary hanger may be substituted therefor. It is evident that if desired the bolt head and nut might change places, the bolt head resting upon the hooks while the nut supports the hanger, but I prefer to place the nut uppermost as it will permit a greater degree of vertical adjustment without having the bolt project so as to be in the way of the pipe.

The bolt may be of any desired length and threaded for a suitable portion of its length, whereby the hanger may be adjusted vertically. It is also evident that this may be done after the pipe is in place as it is not necessary to turn the hanger but only the bolt.

While I have shown a square headed bolt, it is evident that a round headed bolt may be substituted therefor if desired, especially if the head is provided with a nick or other device for rotating the bolt. In this case, however, the nut should rest upon the hooks because they are especially adapted to receive a square nut or bolt head, the two diagonally opposite corners of which enter the space between the hooks as shown and prevent the nut from rotating on the hooks when the bolt is turned, or when the square head of a bolt rests upon the hooks, the bolt is prevented from rotating when the nut is turned.

While I have described the supporting shank 4 as screw threaded, it is evident that a plain shank to be driven into wood like a nail may be substituted therefor if desired.

By my improvements a very simple and inexpensive pipe hanger is produced which may be readily attached to either a side wall or an overhead support and in which the hanger may be adjusted vertically as may be desired.

I claim as my invention—

The combination of two curved hooks arranged side by side with bolt space between, and a hanger supporting bolt and nut with the body of the bolt in the space between said hooks and two corners of the nut resting on said hooks while the other two corners extend in between said hooks and prevent rotation, substantially as described and for the purpose specified.

FRANCIS A. PELTON.

Witnesses:
JAMES SHEPARD,
A. W. STIPEK.